(12) United States Patent
Malachowski

(10) Patent No.: US 7,530,331 B1
(45) Date of Patent: May 12, 2009

(54) WINDOW-MOUNTED LITTER ENCLOSURE WITH INTERIOR AND EXTERIOR HOUSING SECTIONS

(76) Inventor: Gregory Malachowski, 2467 E. Winchester Pl., Chandler, AZ (US) 85249

( * ) Notice: Subject to any disclaimer, the term of this patent is extended or adjusted under 35 U.S.C. 154(b) by 0 days.

(21) Appl. No.: 11/070,176

(22) Filed: Mar. 1, 2005

(51) Int. Cl.
*A01K 1/03* (2006.01)
(52) U.S. Cl. ..................................... 119/484
(58) Field of Classification Search ............... 119/484, 119/485, 482, 28.5, 165, 847
See application file for complete search history.

(56) References Cited

U.S. PATENT DOCUMENTS

| | | | |
|---|---|---|---|
| 5,165,366 A | | 11/1992 | Harvey |
| 5,337,697 A | * | 8/1994 | Trimarchi et al. ............ 119/484 |
| 5,842,438 A | * | 12/1998 | Messmer ..................... 119/165 |
| 5,975,017 A | | 11/1999 | Cameron |
| 6,176,201 B1 | * | 1/2001 | Fields ......................... 119/165 |
| 6,253,711 B1 | * | 7/2001 | Shibles ........................ 119/484 |
| 6,439,161 B1 | * | 8/2002 | Clemmons ................... 119/165 |

* cited by examiner

*Primary Examiner*—Son T. Nguyen
(74) *Attorney, Agent, or Firm*—Gregory J. Nelson

(57) ABSTRACT

An animal enclosure mountable in an access opening such as a window. The enclosure has a section extending to the building interior and an exterior section for containment of a litter box. Sealing member extends on the exterior of the enclosure and is engaged by a sliding window panel. The animal gains entry through a door in the interior section. A platform extends from the door along the window ledge. A low voltage fan unit draws air from the building interior into the enclosure.

3 Claims, 3 Drawing Sheets

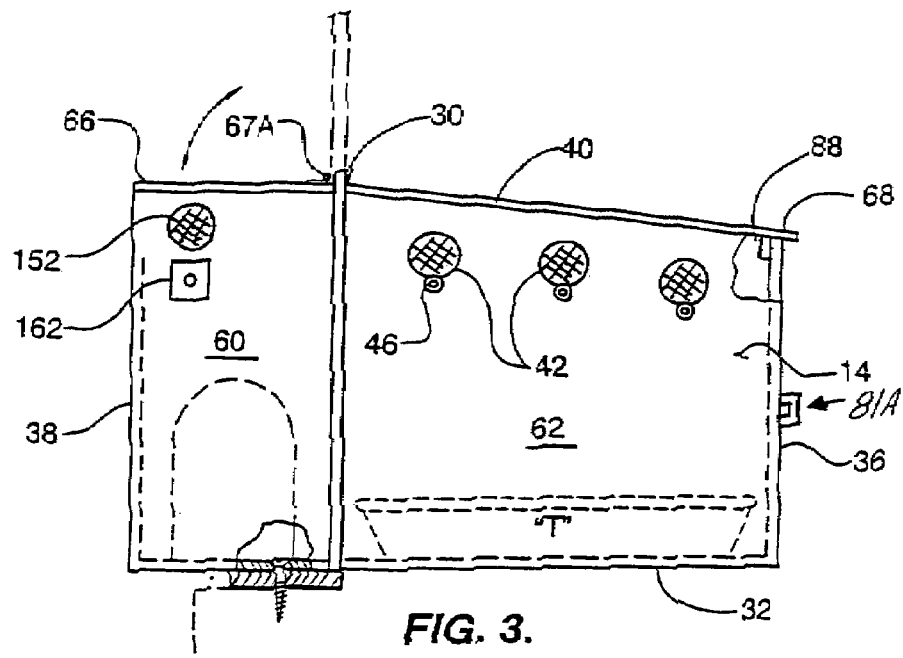
FIG. 3.
FIG. 3A.
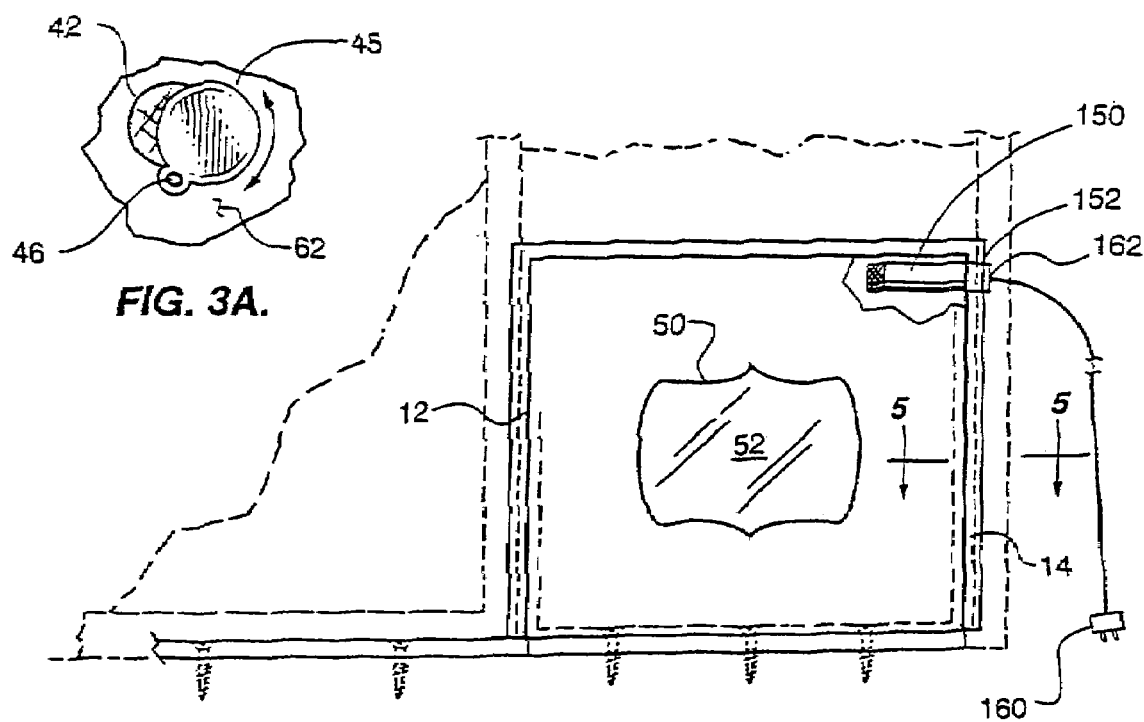
FIG. 4.

WINDOW-MOUNTED LITTER ENCLOSURE WITH INTERIOR AND EXTERIOR HOUSING SECTIONS

FIELD OF THE INVENTION

The present invention relates to an animal enclosure and more particularly relates to an enclosure which may be mounted within an access opening in a building which enclosure has an exterior section which is ventilated for confinement of a litter box and an interior section through which a cat may enter the enclosure from the interior of the building.

BACKGROUND OF THE INVENTION

Domestic cats confined within a house or apartment are usually trained to use a litter box. Generally, the litter box includes a tray in which an absorbent material known as cat litter is placed. Cat owners place litter boxes in out-of-the-way areas such as closets or back bathrooms to minimize odors. However, the offensive odor may often be sensed throughout the area. Various types of deodorizing litter are available and help to minimize unpleasant odors.

Another problem common to the maintenance of cat litter boxes within apartments and dwellings is that cats, in the course of using the litter box or simply engaging in play, will spread the litter in the area around the litter box creating further maintenance problems. Various attempts in the prior art can be found which provide housings or enclosures in which litter boxes may be maintained to reduce odors emanating to the living area and to limit or confine the litter box to minimize tracking and spreading of the cat litter in the living area.

U.S. Pat. No. 5,975,017 shows a housing which is mounted on the exterior side of the dwelling having a storage compartment for removably holding a litter box. A hollow, open-ended tunnel connects the interiors of the dwelling of the housing respectively. The tunnel is rigid in a cantilevered position. A pivotal door in the side of the housing or enclosure permits access for insertion or removal of a litter box. A platform panel with a central hole separates the lower compartment of the litter box from an upper compartment.

U.S. Pat. No. 5,165,366 shows a window-mounted, ventilated litter box for installation on the outer wall of the house to be used with conventional, horizontal or vertical slide windows. A frame is constructed of square, thin-walled steel tubing and has walls made of acrylic to allow sunlight in while keeping a cat safe. A swinging access door is provided at the window opening. The floor of the litter unit has a screen or perforated material which allows ventilation of the litter which is maintained in a litter pan below the floor. The litter pan is easily removed from the bottom of the litter unit for outdoor cleaning. The rear of the litter unit has an upper support portion as part of the upper rear wall; the entire rear wall is dimensioned to completely surround a window opening so the invention may be used with windows that slide vertically or horizontally without need of altering the litter unit or the window in any way.

While the above patents recognize there has been a long standing need to provide a novel enclosure which can be installed to maintain a litter box, the prior art as represented by the above patents, maintain the entire enclosure exteriorly of the building. Therefore, in both cold and hot climates, the enclosure is entirely located at the exterior of the building and is subject to weather, as no part of the enclosure extends to the interior of the building area. Further, access to the litter enclosure is from the outside of the building and in some instances extensive modification or installation procedures must be performed.

BRIEF SUMMARY OF THE INVENTION

Briefly, the disadvantages of the prior art are overcome by the present invention, which provides a novel enclosure for an animal litter box which enclosure may be installed in both horizontal and vertical sliding windows requiring no modification of the window or building structure. The litter enclosure of the present invention has a housing having both an exterior and an interior section. The interior section allows the cat access to the enclosure from within the building and provides an area within the building where the animal may reside. The exterior portion of the enclosure defines a section in which the litter box is placed. The exterior portion is well ventilated and may be accessed either from the interior or the exterior for necessary cleaning and replacement of cat litter material. The enclosure is easily mounted in an existing access opening such as a window by positioning it in the window and bringing either the horizontally or vertically sliding window panel into engagement with the sealing member that extends around the side walls and upper surface of the enclosure. The open area adjacent the enclosure may be easily enclosed by insertion of either a transparent or opaque panel of glass, acrylic plastic or wood. A further feature of the invention is a fan which draws air from the building interior into the enclosure for temperature control and forced air ventilation to minimize odors.

Accordingly, it is a principal object of the present invention to provide a cat litter enclosure that has an exterior section which is ventilated for removal of odors associated with the litter unit and, further, to provide a safe, accommodating area in which the cat may reside within the interior space of the apartment or home.

BRIEF DESCRIPTION OF THE DRAWINGS

The above and other objects, advantages and features of the present invention will become more apparent from the following description, claims and drawings in which:

FIG. 3 is a view of the right side of the litter box enclosure as viewed in FIG. 2;

FIG. 3A is a view of a portion of the interior wall of the enclosure showing the adjustable ventilation shutters;

FIG. 4 is a partial front view of the litter box enclosure of the present invention;

DETAILED DESCRIPTION OF THE DRAWINGS

Figure 1:
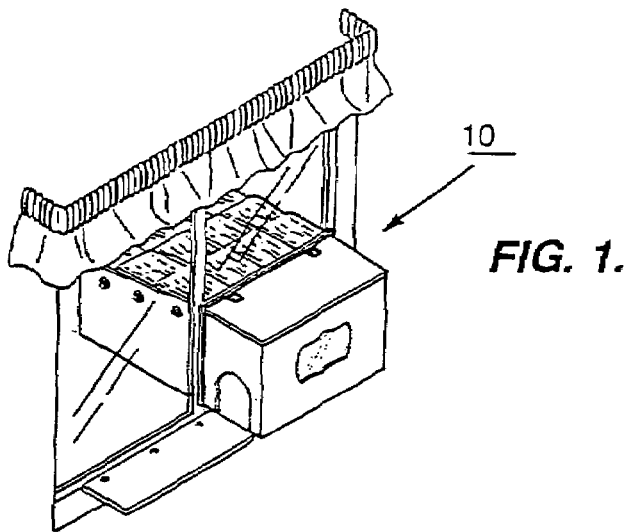
FIG. 1 is a perspective view showing the litter box enclosure of the present invention mounted in a window access opening.

Referring to drawing FIG. 1, the novel enclosure of the present invention for enclosing a litter box is generally indicated by the numeral 10. The enclosure has a housing with opposed vertical sidewalls 12 and 14, front wall 16 and a rear wall 18. Sidewall 12 has a lower, horizontal edge 20, rear vertical edge 22, front edge 24 and top edge 26. The top edge 26 extends generally horizontally from the front wall 16 rearwardly to the location of a sealing member 30 as will be explained. The upper or top edge 26 inclines downwardly and rearwardly from the location of the sealing member 30 to rear edge 22. One or more vent holes 34 are provided in the sidewall 12 in the portion of the sidewall which is disposed at the exterior of the building.

The opposed sidewall 14, as best seen in FIG. 3, is similarly configured having a generally horizontal, bottom edge 32, vertical rear edge 36, vertical front edge 38 and top edge 40 which extends generally parallel to the bottom edge 32 to the location of the sealing member 30 at which location the top edge 40 inclines downwardly to rear edge 36. A plurality of ventilation openings 42 may be placed in the sidewall 14 for ventilation. The openings 42 may be selectively adjustable by shutter 45 which may be pivoted at pivot 46 to regulate air flow, as seen in FIG. 3A. Pivots 46 are accessible at the exterior of the enclosure.

Front wall 16 is generally a rectilinear panel extending between the sidewalls 12 and 14 extending upwardly from the bottom edge of the side panels. The front panel 16 is provided with a cutout 50 which may be in a decorative shape as shown which is covered by a suitable transparent material such as an acrylic plastic 52 which provides the animal a viewing window. A planar floor 54 extends across the entire bottom of the unit from the front wall and rear wall extending between the sidewalls. The material of the various panels may be any suitable material such as a hard wood, plywood or plastic material. The components may be joined by any suitable means such as use of adhesives and fasteners as shown. In a molded construction, the enclosure would be a unitary structure.

As thus constructed, the unit defines basically an interior section 60 which is located within the residence or living area and an exterior portion 62 which is disposed on the outside of the building. A panel 66 is hingedly secured to accessibly enclose the interior section of the enclosure. Hinges 67, 67A are secured to the sealing barrier 30. As shown in FIG. 3, the panel 66 can be raised to provide access to the interior of the enclosure for cleaning and maintenance such as removal and replacement of the litter tray. The litter tray is designated by the letter T in FIG. 3.

Figure 2:
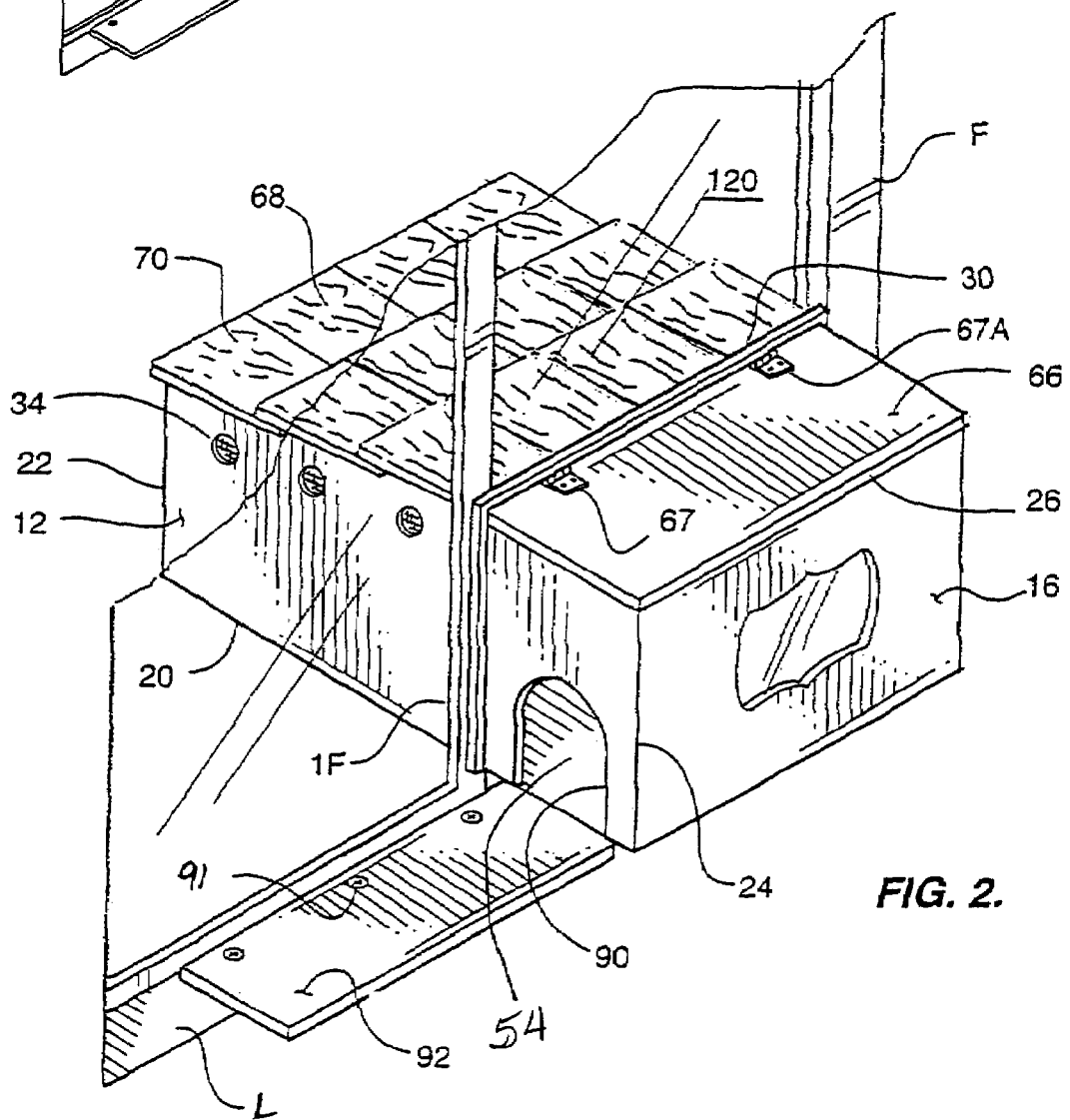
FIG. 2 is a large, detail perspective view similar to FIG. 1.
Figure 5:
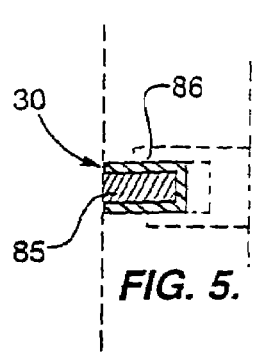
FIG. 5 is a sectional view taken along 5-5 of FIG. 4 illustrating the ceiling member which extends partially around the enclosure.

The exterior portion or section of the enclosure is covered by a fixed roofing structure 68 which may be a single panel of durable material which may be covered with a suitable roofing material such as shingles 70 as best seen in FIG. 2. The shingles overlap one another and are rearwardly inclined and provide protection and also are aesthetically pleasing. Vents may be provided in the roof 68, but it is preferred that the vents be maintained in the side and rear walls so that water may be prevented from entering the enclosure. Preferably all the vents are covered with screen to prevent insects and birds from entering the enclosure.

Figure 6:
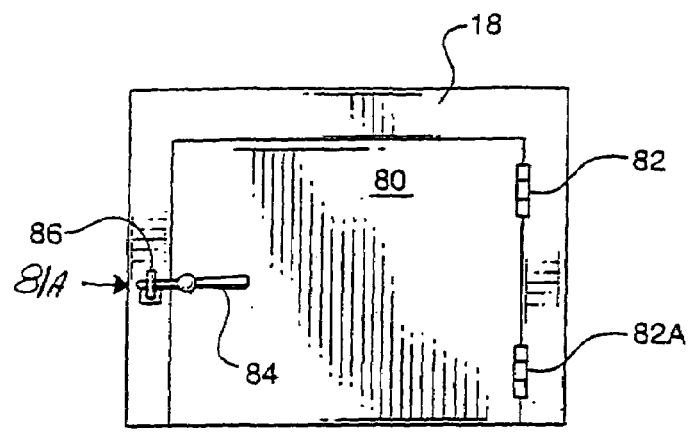
FIG. 6 is a rear view of the litter box enclosure of the present invention.

Access door 80 is provided in the rear wall 18. The access door 80 is pivotal at hinges 82, 82A and may be secured by a suitable latch 81A having a lever 84 and a locking bar 86. In FIG. 6, the latch is shown disposed on the exterior of the door in which case the bar would have provision for securement of a pad lock. It may be desirable for security purposes to maintain the latch mechanism on the interior of the door within the enclosure section 62 which would include a suitable release cable 88 which can be easily accessed by the pet owner by lifting the panel 66.

The feline can easily access the enclosure by means of access opening 90 which is provided in the front of sidewall 12 within the building. A platform 92 extends outwardly from the access opening and provides a surface upon which the cat can stand or sit and this platform will also assist the cat in entering or exiting the enclosure.

The enclosure of the present invention can be easily installed and accommodated in window access openings having either vertically or horizontally sliding windows with little or no modification to the window or structure being required. To accommodate installation, a sealing bar 30 extends vertically along the opposite sidewalls 12 and 14 and horizontally between the sidewalls at a location intermediate the front and rear walls. This sealing bar 30 includes a wooden, plastic or other rigid strip 85 secured to the exterior of the housing. The strip is covered with a suitable resilient material 86 such as an expanded foam. To install the enclosure in a vertically sliding window, as seen in FIG. 2, one of the window panels such as a right hand window panel as seen in FIG. 2 is opened. The pet enclosure 10 is then placed in the window frame with the sealing bar 30 aligned with the channels or grooves which extend in the window frame VF at the edge of the sliding window panel. The platform 92 will rest on the existing ledge L which is conventional in most windows. The pet enclosure 10 may then be secured by fasteners 91 extending through the platform into the ledge L. The window slider or panel is brought into engagement to engage the vertically extending sealing bar on side 12. The bar 30 on side 14 is engaged in the side frame member F. In this position, the enclosure is secured and sealed at opposite sides to prevent escape of hot or cold air from the living area and to prevent migration of moisture or entrance of insects.

The area above the enclosure formerly occupied by the sliding window can be enclosed by an insert panel 120. The insert panel 120 can be either transparent or opaque. A representative panel would be a section of acrylic which is inserted into this area also held by the channels or grooves at the window frame F and sliding a window slider VF. The panel is held in place at its upper side edges by the window structure and may be secured by an adhesive or fasteners to the horizontally extending sealing bar. The window panel may be locked using C-shaped channel locks or by insertion of a blocking rod to prevent the window from being moved. These type of locks are conventional.

Figure 7:
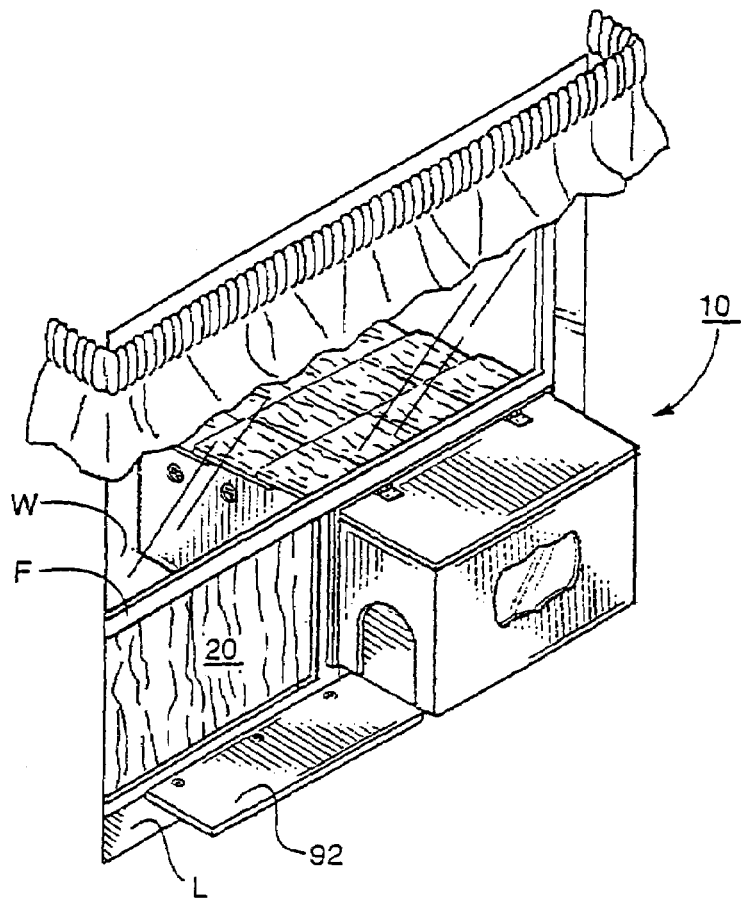
FIG. 7 is a perspective view illustrating the use of the litter box enclosure in conjunction with a vertically sliding window in which an insert member has been positioned in a part of the window.

In the event the window is a vertically sliding unit, the installation would be as shown in FIG. 7 with the enclosure 10 placed in the window ledge L below the bottom edge of the vertical slider panel and the bottom edge of the window. The platform 92 is secured to the window ledge by suitable fasteners. The horizontal window section W is lowered so that the groove in the lower edge of the frame F is in sealing engagement with sealing member 30 extending horizontally across the top of the enclosure. In this embodiment, an insert panel 120 of plywood has been cut to size and inserted so it fits snugly and is received in the groove at the horizontal bottom edge of the slider and the channel at the bottom of the window frame.

A further feature of the invention is the provision of a fan unit 150 installed in the interior enclosure 60 below the panel 66. The fan unit is adjacent a screened air inlet 152 and is preferably a low voltage device connectable to an outlet at transformer 160. Fans of the type used to cool computer components work well for this purpose. The fan is caged so that the animal cannot contact the moving fan parts. When the fan is actuated by off-on switch 162, air is drawn into the enclosure from the building interior. This air flow provides several benefits as it provides ventilation carrying odors to the exterior through vents 34 and 42. Further, the air flow will provide either heating or cooling depending on the existing temperature condition in the building. Preliminary tests have demonstrated that as much as a 25° heating or cooling deviation from outside ambient temperature may be achieved by using the fan to draw climate controlled interior air into the enclosure. Thus, the animal in the enclosure will be more comfortable both in hot weather and cold weather conditions.

Therefore, from the foregoing, it will be seen that the enclosure device of the present invention is readily and conveniently installed using a minimum of tools which can be accomplished by the homeowner. Once in place, the enclosure provides both an exterior section in which is contained a litter tray, the exterior section being well ventilated to maintain odors emitting from the litter tray at the exterior of the building. The owner can access the litter tray from either the interior or the exterior for necessary maintenance. In addition, the enclosure provides an interior room area in which the cat can reside provided with a view of the interior of the residence. The feline can easily enter and exit the enclosure by means of a platform and convenient access opening.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. An animal enclosure installable in an access opening in a building, said access opening having a slidable panel, said enclosure comprising:
  (a) a generally rectangular housing having a front wall, a rear wall, a bottom wall and opposite sidewalls generally perpendicular to said front and rear walls, said housing defining an animal enclosure having a front interior section and a rear exterior section, said housing positionable in said access opening with the interior section extending through the access opening into the building and with the exterior section extending from the access opening outside the building without modification to the access opening;
  (b) a first top panel extending between said sidewalls over said exterior section forming a roof;
  (c) a second top panel having opposite side edges, a front edge and a rear edge, said second panel extending over said interior section and hinged to said first top panel along the rear of the edge of the top panel whereby said second top panel may be manually opened from within the building to access said interior section;
  (d) one of said sidewalls defining an animal entry opening into said interior section;
  (e) a generally horizontal platform extending outwardly from said access opening and securable to a horizontal surface of said access opening;
  (f) a resilient seal extending upwardly along both said sidewalls and across said second top panel and engageable with said slidable panel to provide a weather seal along one of said sidewalls or top panels;
  (g) at least one vent opening in one of said sidewalls in the exterior section;
  (h) a lockable rear door in said rear wall;
  (i) said front wall defining a window; and
  (j) an electric low voltage fan in said interior section adjacent the top generally opposite said access opening to draw air through said access opening into said enclosure from the building interior and establish an airflow discharging air through said vent to remove odors to the exterior of the building and to control the environment within the enclosure.

2. The animal enclosure of claim 1 wherein said interior section defines a window.

3. The animal enclosure of claim 1 including a lockable door in said rear wall.

* * * * *